US012222205B2

(12) United States Patent
Aldeborgh et al.

(10) Patent No.: US 12,222,205 B2
(45) Date of Patent: Feb. 11, 2025

(54) SYSTEMS AND METHODS FOR UTILIZING MODELING TO AUTOMATICALLY GENERATE PATHS FOR INDOOR NAVIGATION

(71) Applicant: Verizon Patent and Licensing Inc., Basking Ridge, NJ (US)

(72) Inventors: Hannah Nicole Aldeborgh, Denver, CO (US); Florin Alexandrescu, Denver, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 12 days.

(21) Appl. No.: 17/663,522

(22) Filed: May 16, 2022

(65) Prior Publication Data
US 2022/0276058 A1    Sep. 1, 2022

Related U.S. Application Data

(63) Continuation of application No. 16/693,045, filed on Nov. 22, 2019, now Pat. No. 11,346,669.

(51) Int. Cl.
| G01C 21/20 | (2006.01) |
| G01C 21/34 | (2006.01) |
| G05D 1/00 | (2006.01) |
| G06N 20/00 | (2019.01) |
| H04W 4/02 | (2018.01) |

(52) U.S. Cl.
CPC ....... *G01C 21/206* (2013.01); *G01C 21/3446* (2013.01); *G05D 1/0088* (2013.01); *G06N 20/00* (2019.01); *H04W 4/025* (2013.01)

(58) Field of Classification Search
CPC .............. G01C 21/206; G01C 21/3446; G05D 1/0088; G06N 20/00; G06N 5/01; G06N 20/10; H04W 4/025; H04W 4/33
See application file for complete search history.

(56) References Cited

U.S. PATENT DOCUMENTS

| 9,772,193 | B1 * | 9/2017 | Mendelson | ........... H04W 76/50 |
| 10,254,380 | B2 * | 4/2019 | Tran | ..................... G01C 21/206 |
| 11,043,026 | B1 * | 6/2021 | Fathi | ..................... G06N 20/00 |

(Continued)

OTHER PUBLICATIONS

Liu_Path-finding_Strategy_Indoor_Navigation (Year: 2013).*

(Continued)

*Primary Examiner* — Ashley L Redhead, Jr.

(57) ABSTRACT

A device may receive an architectural floor plan of an interior of a building, and may process the architectural floor plan, with a vectorization model, to generate a vectorized floor plan of polygons. The device may process the vectorized floor plan, with a convex hull model, to create convex hull polygons around the polygons of the vectorized floor plan, and may reduce a quantity of vertices associated with the convex hull polygons to generate simplified convex hull polygons. The device may generate, based on the simplified convex hull polygons, one of a visibility graph that identifies potential paths through the interior of the building, or a walking path network through the interior. The device may process the one of the visibility graph or the walking path network, with a pathfinding model, to identify paths through the interior of the building, and may perform actions based on the identified paths.

19 Claims, 15 Drawing Sheets

(56) References Cited

U.S. PATENT DOCUMENTS

| | | | |
|---|---|---|---|
| 11,094,113 B2* | 8/2021 | Mundy | G06T 7/593 |
| 2009/0043504 A1* | 2/2009 | Bandyopadhyay | G01S 19/49 |
| | | | 701/469 |
| 2010/0023252 A1* | 1/2010 | Mays | G01C 21/3423 |
| | | | 701/533 |
| 2013/0104073 A1* | 4/2013 | Bowditch | G06T 17/05 |
| | | | 715/782 |
| 2015/0373482 A1* | 12/2015 | Barnard | H04W 4/024 |
| | | | 370/338 |
| 2016/0217225 A1* | 7/2016 | Bell | G06F 30/13 |
| 2016/0286351 A1* | 9/2016 | Glenn, III | H04W 4/023 |
| 2016/0298969 A1* | 10/2016 | Glenn, III | G01S 5/0264 |
| 2017/0082723 A1* | 3/2017 | Pajovic | G01S 5/0278 |
| 2018/0350216 A1* | 12/2018 | Satkin | G08B 13/19639 |
| 2020/0349351 A1* | 11/2020 | Brook | G06V 20/20 |
| 2021/0073449 A1* | 3/2021 | Segev | G06F 30/27 |
| 2021/0156693 A1* | 5/2021 | Aldeborgh | G06N 20/00 |
| 2021/0165924 A1* | 6/2021 | Yoon | H04M 1/725 |
| 2021/0255539 A1* | 8/2021 | Cecil | G03F 1/36 |
| 2021/0264667 A1* | 8/2021 | Herpin | G06T 17/10 |
| 2021/0278219 A1* | 9/2021 | McEvoy | G01C 21/3848 |
| 2022/0067962 A1* | 3/2022 | Daniels | G06T 11/203 |
| 2022/0092227 A1* | 3/2022 | Yin | G06F 18/21355 |

OTHER PUBLICATIONS

Aurenhammer, et al., "Voronoi Diagrams", Institut fur Grundlagen der Informationsverarbeitung, Technische Universitat Graz Klosterwiesgasse 32/2, A-8010 Graz, Austria. Partially supported by the Deutsche Forschungsgemeinschaft, grant KI 655 2-2. Nov. 19, 1996.

Mayya, et al., "Voronoi Diagrams of Polygons: A Framework for Shape Representation", IBM Research Report RC 19282, Nov. 23, 1993, pp. 32.

Vinther, et al., "Pathfinding in Two-dimensional Worlds", Aarhus University—Computer Science, Master's Thesis, a Survey of Modern Pathfinding Algorithms, and a Description of a New Algorithm for Pathfinding in Dynamic Two-Dimensional Polygonal Worlds. Jun. 2015, 70 p.p.

Witrisal, et al., "High-accuracy Positioning for Indoor Applications: RFID, UWB, 5G, and beyond", 2016 IEEE International Conference on RFID (RFID), 2016, pp. 1-7, doi: 10.1109/RFID.2016.7487999.

* cited by examiner

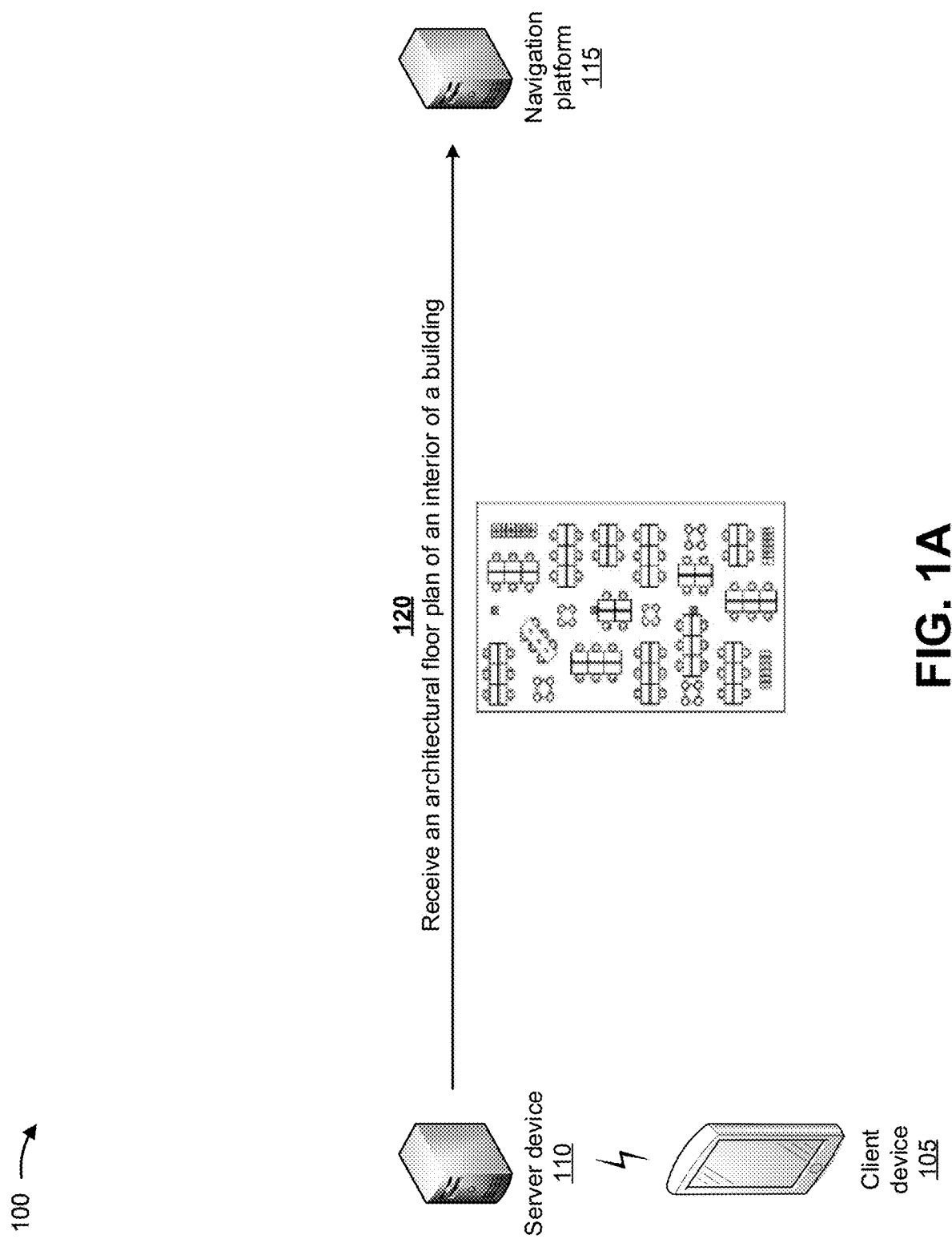

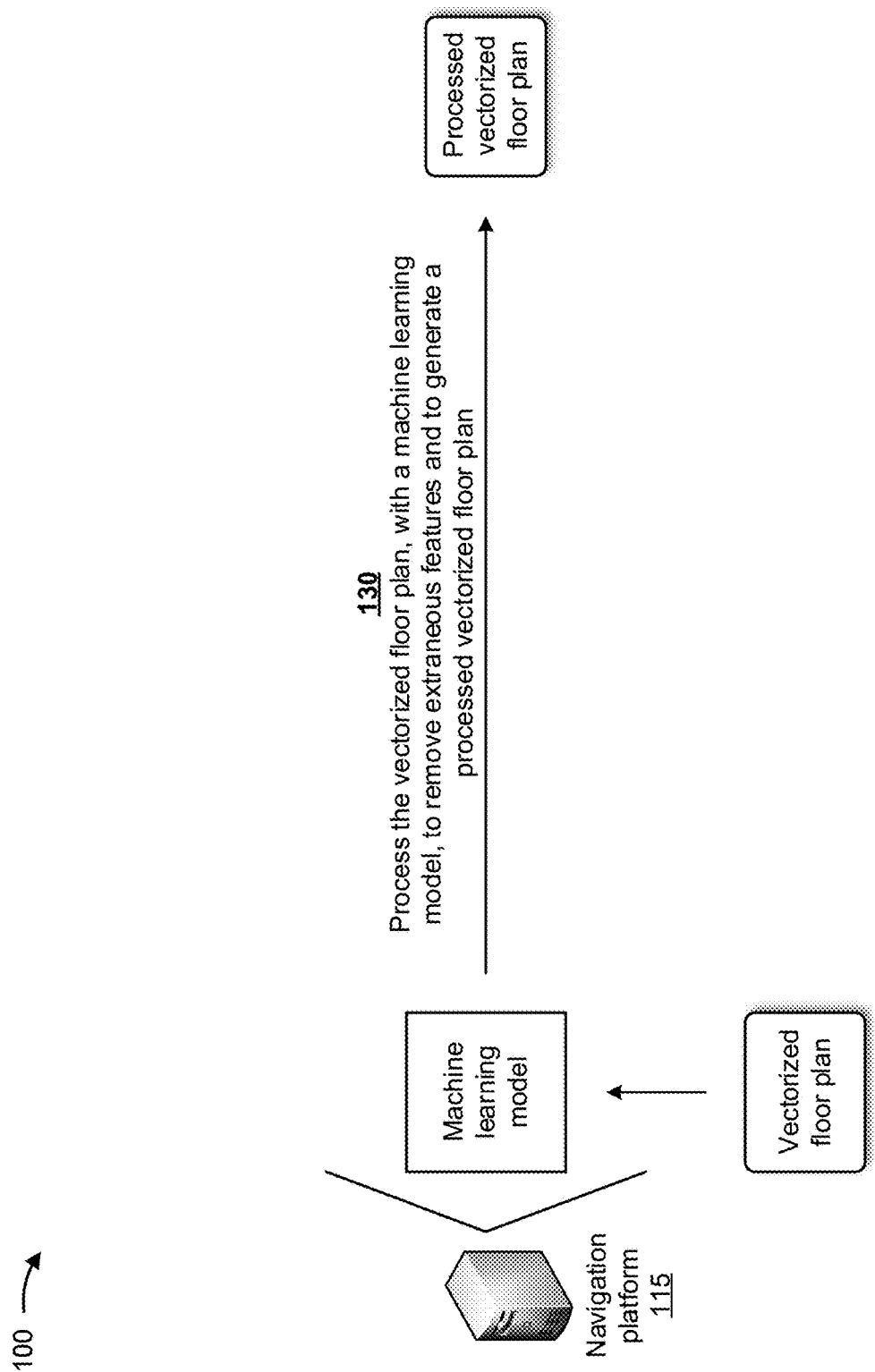

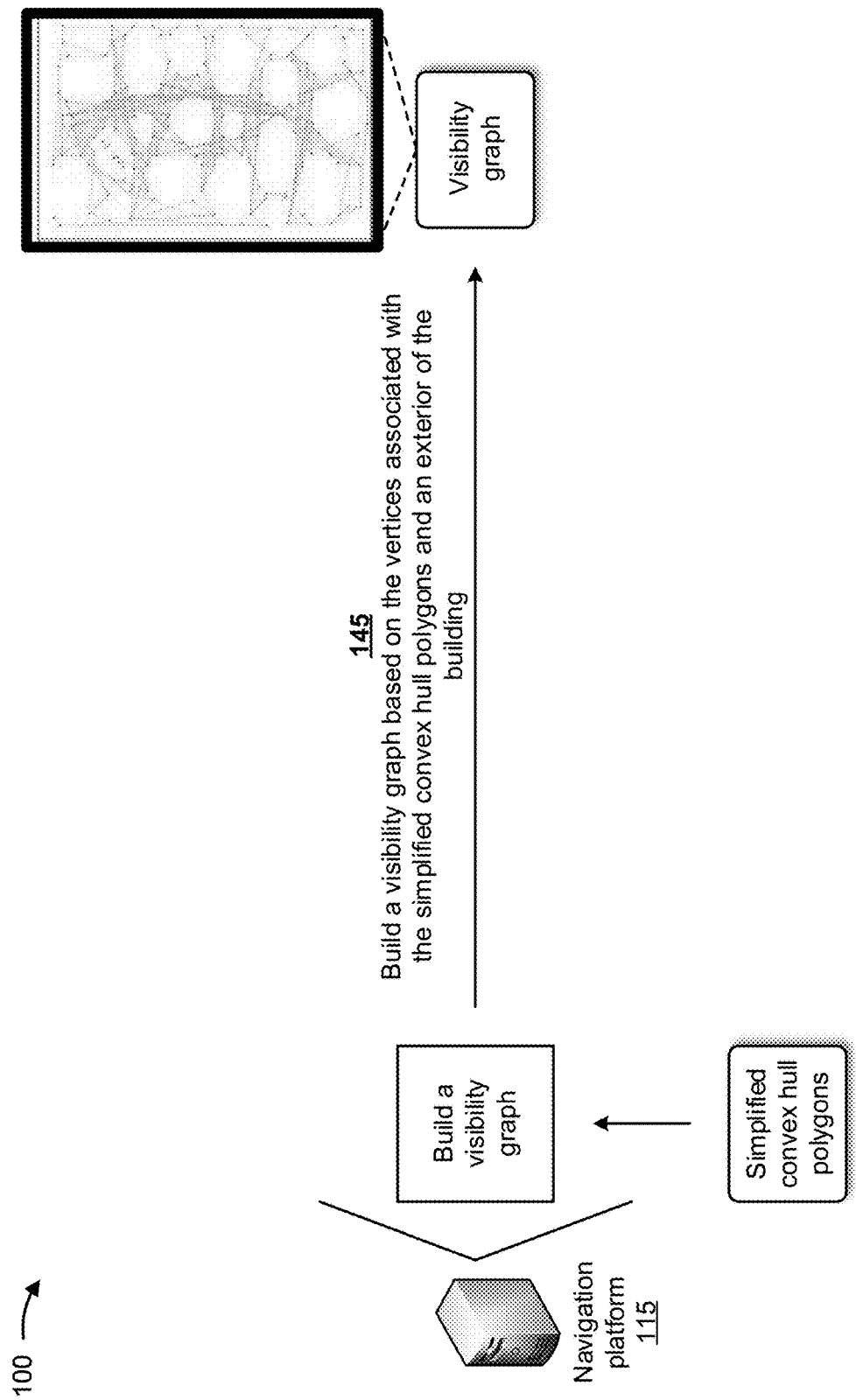

SYSTEMS AND METHODS FOR UTILIZING MODELING TO AUTOMATICALLY GENERATE PATHS FOR INDOOR NAVIGATION

RELATED APPLICATION

This application is a continuation of U.S. patent application Ser. No. 16/693,045 (now U.S. Pat. No. 11,346,669), entitled "SYSTEMS AND METHODS FOR UTILIZING MODELING TO AUTOMATICALLY GENERATE PATHS FOR INDOOR NAVIGATION," filed Nov. 22, 2019, which is incorporated herein by reference in its entirety.

BACKGROUND

People have become increasingly reliant on outdoor navigation that provides exact locations, provides most efficient paths to destinations, and exactly how long it will take to arrive at the destinations. Outdoor navigation is efficient and useful due to accurate global positioning system (GPS) localization and an amalgam of geospatial data.

BRIEF DESCRIPTION OF THE DRAWINGS

FIGS. 1A-1L are diagrams of one or more example implementations described herein.

DETAILED DESCRIPTION OF PREFERRED EMBODIMENTS

Figure 1B:
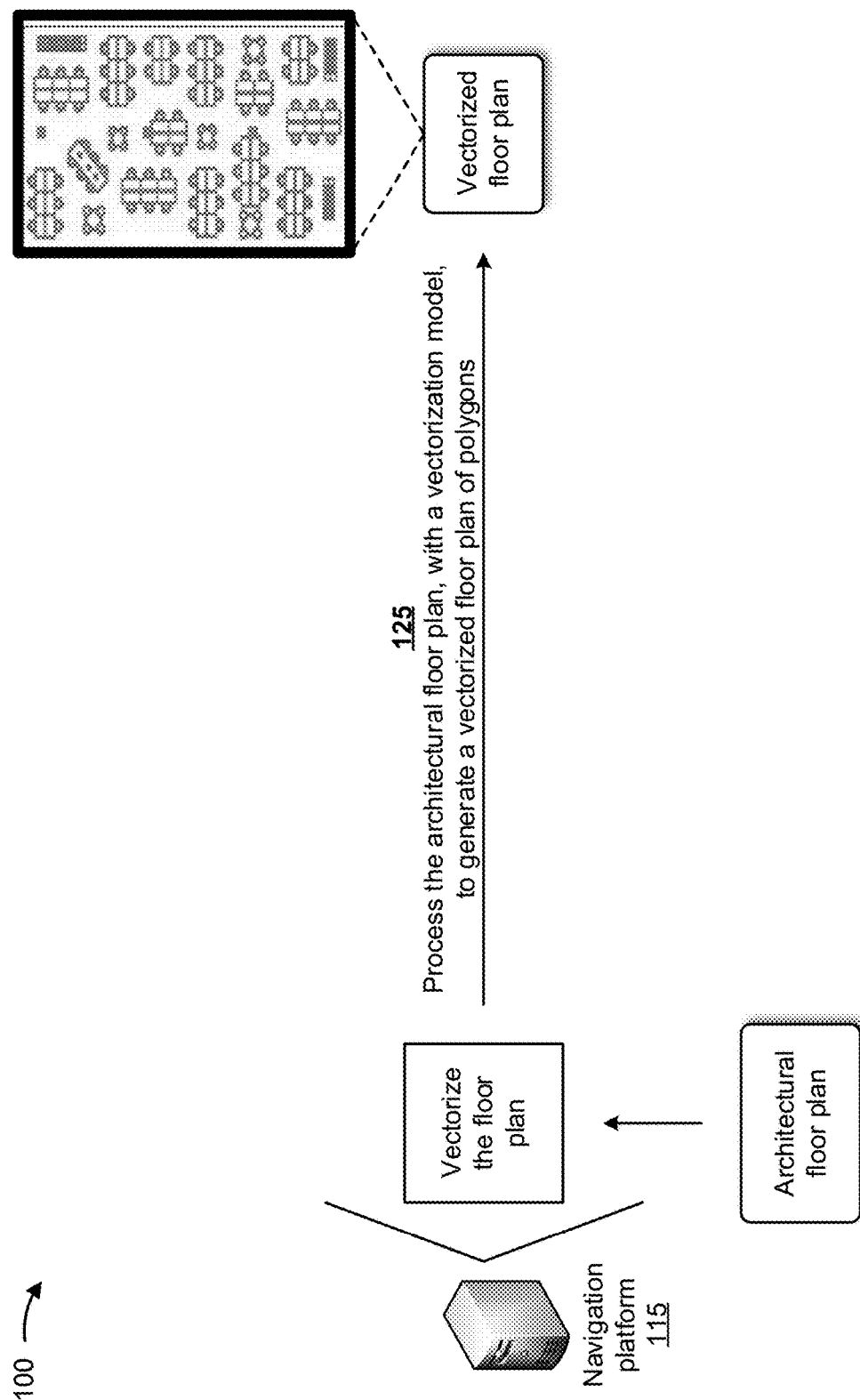

The following detailed description of example implementations refers to the accompanying drawings. The same reference numbers in different drawings may identify the same or similar elements.

Indoor navigation of a building may utilize GPS localization to provide an accurate location of a client device associated with a user, but lacks geospatial data required to provide walking paths through an interior of the building. Indoor navigation also has a difficult time using GPS signals due to a lack of a clear line of sight to GPS satellites. While roads can be extracted by combining satellite imagery and public databases, indoor layouts of buildings are seldom publicly available, and are generally far more dynamic than outdoor infrastructure. Without a reliable way to automatically map indoor layouts of buildings, determining walking paths through buildings requires tedious, time consuming, and manual mapping of the walking paths. Without a more efficient and robust approach to mapping walking paths through interiors of buildings, indoor navigation is completely unscalable. Thus, current techniques waste computing resources (e.g., processing resources, memory resources, communication resources, and/or the like), networking resources, human resources, and/or the like mapping walking paths through interiors of buildings, incorrectly generating walking paths, correcting the incorrectly-generated walking paths, and/or the like.

Some implementations described herein provide a navigation platform that utilizes modeling to automatically generate paths for indoor navigation. For example, the navigation platform may receive an architectural floor plan of an interior of a building, and may process the architectural floor plan, with a vectorization model, to generate a vectorized floor plan of polygons. The navigation platform may process the vectorized floor plan, with a convex hull model, to create convex hull polygons around the polygons of the vectorized floor plan, and may reduce a quantity of vertices associated with the convex hull polygons to generate simplified convex hull polygons. The navigation platform may generate, based on the simplified convex hull polygons, one of a visibility graph that identifies potential paths through the interior of the building, or a walking path network through the interior of the building. The navigation platform may process the one of the visibility graph or the walking path network, with a pathfinding model, to identify paths through the interior of the building, and may perform one or more navigation actions based on the identified paths.

In this way, the navigation platform utilizes modeling to automatically generate paths for indoor navigation, which enables users of an interior of a building and autonomous vehicles implemented in the interior of the building to navigate the interior. Thus, the navigation platform reduces time required to map paths through an interior of a building, and conserves computing resources, networking resources, human resources and/or the like that would otherwise be wasted incorrectly generating walking paths, correcting the incorrectly-generated walking paths, and/or the like.

FIGS. 1A-1L are diagrams of one or more example implementations 100 described herein. As shown in FIG. 1A, a client device 105 may be associated with a server device 110 and a navigation platform 115. In some implementations, client device 105 may include a mobile device, a computer, a telephone, and/or the like that a user may utilize to cause server device 110 to provide information to navigation platform 115. The user may also utilize client device 105 to interact with and/or receive information from navigation platform 115. Server device 110 may include a device that stores and provides architectural floor plans of interiors of buildings to navigation platform 115. Navigation platform 115 may include a platform that utilizes modeling to automatically generate paths for indoor navigation based on the architectural floor plans provided by server device 110.

As further shown in FIG. 1A, and by reference number 120, navigation platform 115 may receive an architectural floor plan of an interior of a building. For example, the architectural floor plan may include a file (e.g., a bitmap image file, a raster image file, a computer-aided design (CAD) drawing, and/or the like) that represents an interior of the building (e.g., an image of an interior floor plan showing an overhead view of rooms, walls, dividers, spaces, objects, obstacles, and/or other physical features at one level of the building, such as an office, a floor of the building, a level of a public venue, and/or the like). In some implementations, the file may be generated by CAD software, by scanning a physical printout or drawing of a floor plan, and/or the like. In some implementations, navigation platform 115 may store the architectural floor plan in a data structure (e.g., a database, a table, a list, and/or the like) associated with navigation platform 115.

As shown in FIG. 1B, and by reference number 125, navigation platform 115 may process the architectural floor plan to generate a vectorized floor plan of polygons. In some implementations, navigation platform 115 may utilize a vectorization model that converts the architectural floor plan (e.g., from an image format) into a vector representation of the architectural floor plan. For example, the vectorization model may convert a two-dimensional image (e.g., the architectural floor plan) into a two-dimensional vector representation of the image. The vector representation may be provided in a vector file format (e.g., a scalable vector graphics (SVG) format, an encapsulated postscript (EPS) format, and/or the like) and may represent the architectural floor plan as a set of vectors or shapes (e.g., polygons), as shown in FIG. 1B. The vector representation may correspond to the vectorized floor plan of polygons. In some implementations, the architectural floor plan may be in a vector file format and may not need to be converted to the vectorized floor plan. In some implementations, navigation platform 115 may store the vectorized floor plan in a data structure (e.g., a database, a table, a list, and/or the like) associated with navigation platform 115.

As shown in FIG. 1C, and by reference number 130, navigation platform 115 may process the vectorized floor plan, with a machine learning model, to remove extraneous features and to generate a processed vectorized floor plan. The machine learning model may recognize the extraneous features based on metadata included in the vectorized floor plan, based on image recognition of the extraneous features, and/or the like. In some implementations, an extraneous feature may include a representation of a doorway, textual information, one or more compass arrows, an architectural icon that does not represent an actual physical feature of the building, and/or the like. In this way, navigation platform 115 may remove data associated with polygons that represent features that are not associated with obstacles to potential routes or pathways that may be traversed within the interior of the building, as described herein.

In some implementations, the machine learning model may be trained based on historical data. The historical data may include multiple vectorized floor plans that include multiple extraneous features not associated with actual physical features of multiple buildings, multiple features associated with actual physical features of the multiple buildings, pathways through the multiple buildings, and/or the like. In some implementations, when training the machine learning model, navigation platform 115 may separate the historical data into a training set, a validation set, a test set, and/or the like. The training set may be utilized to train the machine learning model. The validation set may be utilized to validate results of the trained machine learning model. The test set may be utilized to test operation of the machine learning model.

In some implementations, navigation platform 115 may train the machine learning model using, for example, an unsupervised training procedure. For example, navigation platform 115 may perform dimensionality reduction to reduce the historical data to a minimum feature set, thereby reducing resources (e.g., processing resources, memory resources, and/or the like) to train the machine learning model, and may apply a classification technique to the minimum feature set.

In some implementations, navigation platform 115 may use a logistic regression classification technique to determine a categorical outcome (e.g., that a feature of a vectorized floor plan is an extraneous feature). Additionally, or alternatively, navigation platform 115 may use a naïve Bayesian classifier technique. In this case, navigation platform 115 may perform binary recursive partitioning to split the historical data into partitions and/or branches and use the partitions and/or branches to determine outcomes (e.g., that a feature of a vectorized floor plan is an extraneous feature). Based on using recursive partitioning, navigation platform 115 may reduce utilization of computing resources relative to manual, linear sorting and analysis of data points, thereby enabling use of thousands, millions, or billions of data points to train the machine learning model, which may result in a more accurate model than using fewer data points.

Additionally, or alternatively, navigation platform 115 may use a support vector machine (SVM) classifier technique to generate a non-linear boundary between data points in the training set. In this case, the non-linear boundary is used to classify test data into a particular class.

Additionally, or alternatively, navigation platform 115 may train the machine learning model using a supervised training procedure that includes receiving input to the machine learning model from a subject matter expert, which may reduce an amount of time, an amount of processing resources, and/or the like to train the machine learning model relative to an unsupervised training procedure. In some implementations, navigation platform 115 may use one or more other model training techniques, such as a neural network technique, a latent semantic indexing technique, and/or the like. For example, navigation platform 115 may perform an artificial neural network processing technique (e.g., using a two-layer feedforward neural network architecture, a three-layer feedforward neural network architecture, and/or the like) to perform pattern recognition with regard to patterns of the historical data. In this case, using the artificial neural network processing technique may improve an accuracy of the trained machine learning model generated by navigation platform 115 by being more robust to noisy, imprecise, or incomplete data, and by enabling navigation platform 115 to detect patterns and/or trends undetectable to human analysts or systems using less complex techniques.

In some implementations, rather than training the machine learning model, navigation platform 115 may receive a trained machine learning model from another device (e.g., a server device). For example, a server device may generate the trained machine learning model based on having trained machine learning model in a manner similar to that described above, and may provide the trained machine learning model to navigation platform 115 (e.g., may pre-load navigation platform 115 with the trained machine learning model, may receive a request from navigation platform 115 for the trained machine learning models, may periodically provide the trained machine learning model to navigation platform 115 without receiving a request, and/or the like).

Figure 1D:
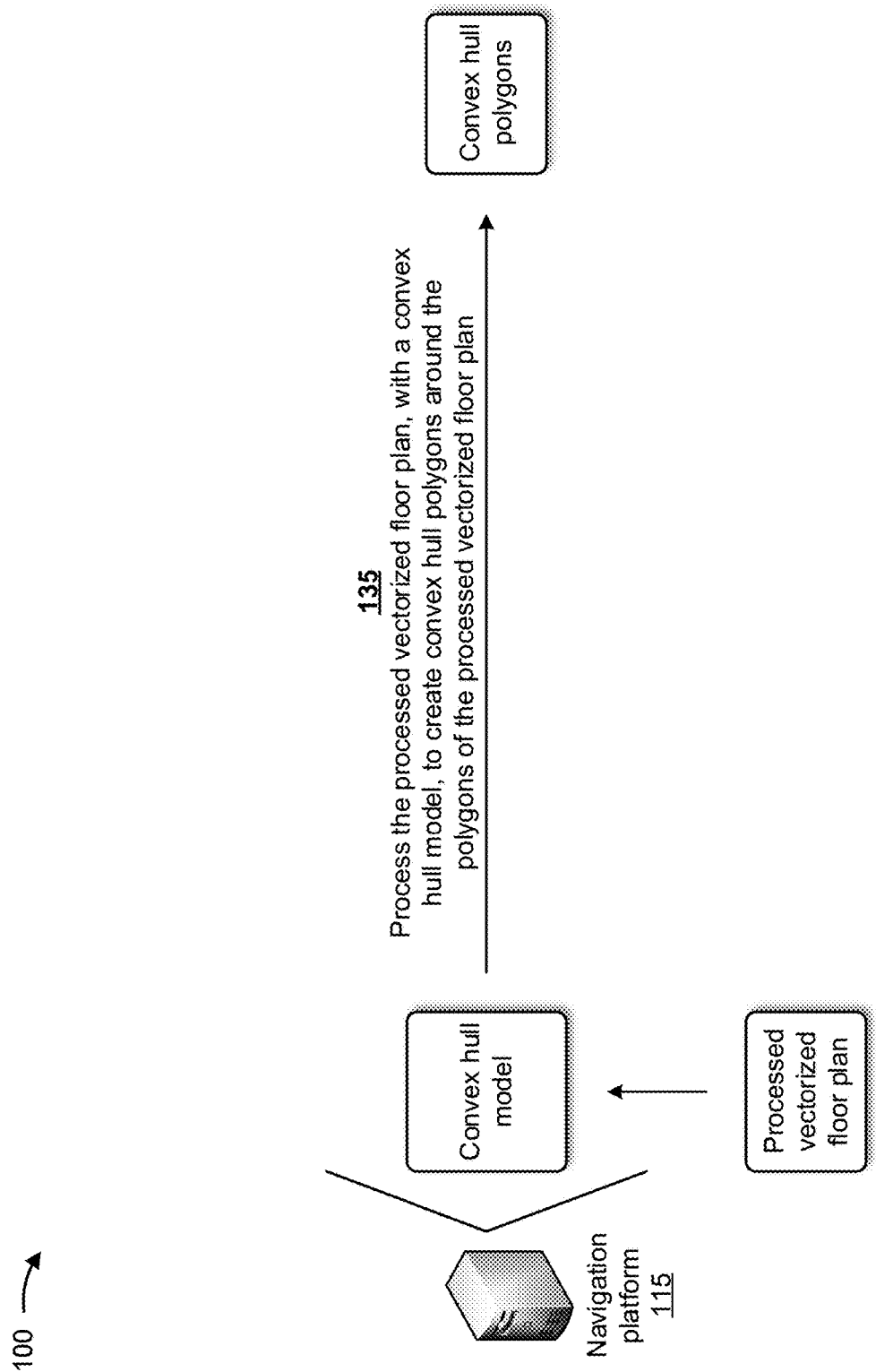

As shown in FIG. 1D, and by reference number 135, navigation platform 115 may process the processed vectorized floor plan to create polygons (e.g., convex hull polygons,) around the polygons of the processed vectorized floor plan. In some implementations, for each polygon of the processed vectorized floor plan, navigation platform 115 may utilize a convex hull model to generate a convex hull polygon (e.g., a shrink wrap). In some aspects, the convey hull polygon may be the smallest convex polygon that encloses all of the vertices of the polygon. Given a set of points in a plane, a convex hull of the set of points is a smallest convex polygon that contains all the points of the set of points. Thus, each of the convex hull polygons may include vertices (e.g., points) that correspond to vertices (e.g., points) of a corresponding one of the polygons included in the processed vectorized floor plan. In some implementations, navigation platform 115 may store the convex hull polygons (e.g., data identifying the convex hull polygons) in a data structure (e.g., a database, a table, a list, and/or the like) associated with navigation platform 115.

Figure 1E:
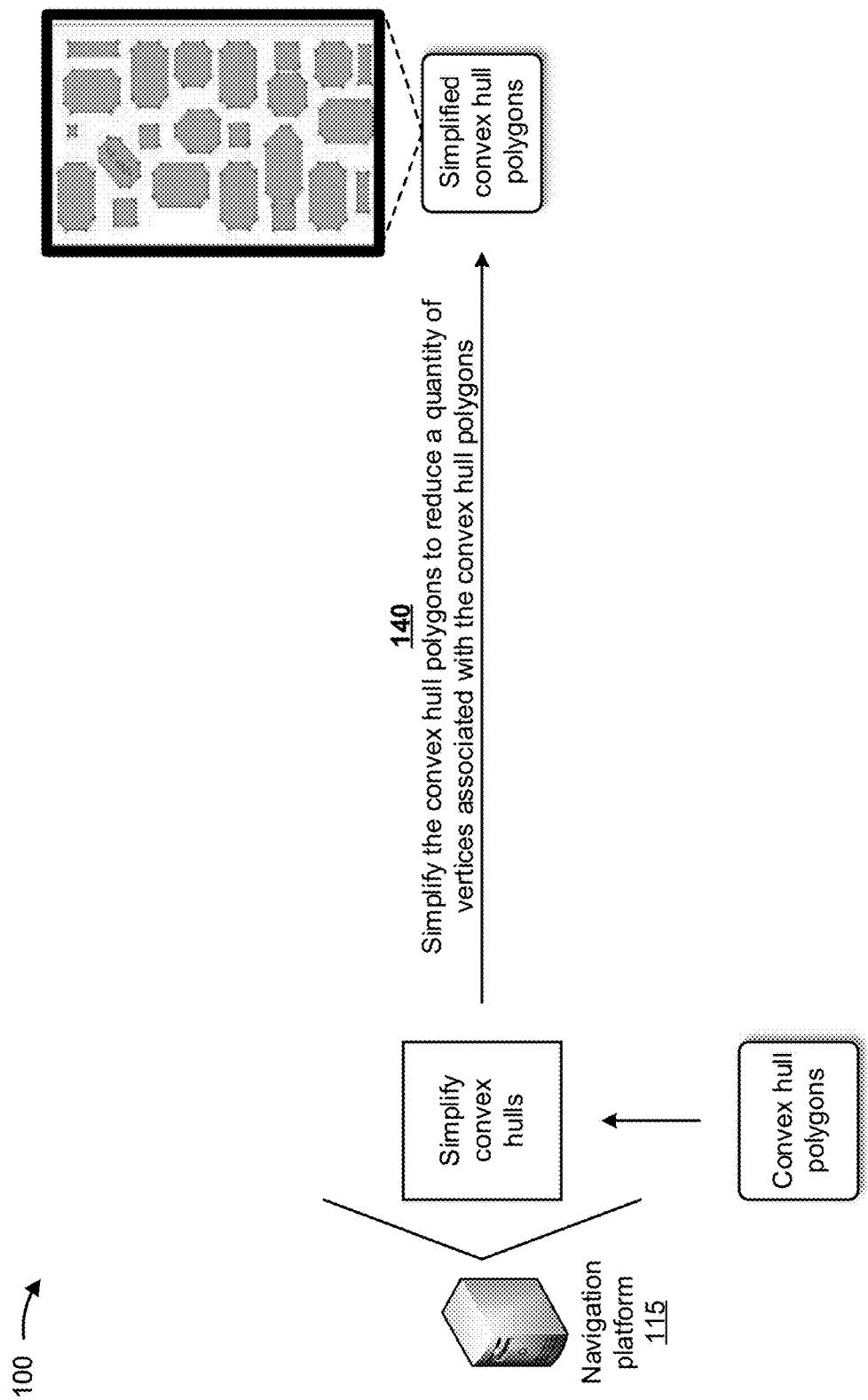

As shown in FIG. 1E, and by reference number 140, navigation platform 115 may simplify the convex hull polygons to reduce a quantity of vertices associated with the convex hull polygons. For example, navigation platform 115 may simplify the convex hull polygons by removing interior vertices (e.g., points) provided inside the complex hull polygons and maintaining exterior vertices (e.g., points) provided outside of the complex hull polygons. In some implementations, navigation platform 115 may simplify the convex hull polygons that are entirely adjacent or overlapping (e.g., have no space between them or less than a threshold space between them) by removing vertices that are adjacent or overlapping from the complex hull polygons. In this way, navigation platform 115 may generate simplified convex hull polygons. In some implementations, navigation platform 115 may store the simplified convex hull polygons in a data structure (e.g., a database, a table, a list, and/or the like) associated with navigation platform 115.

In some implementations, and as described below in connection with FIGS. 1F and 1G, navigation platform 115 may generate, based on the simplified convex hull polygons, a visibility graph that identifies potential paths through the interior of the building, and may process the visibility graph, with a pathfinding model, to identify paths through the interior of the building. Additionally, or alternatively, and as described below in connection with FIGS. 1H-1K, navigation platform 115 may generate, based on the simplified convex hull polygons, a walking path network through the interior of the building, and may process the walking path network, with a pathfinding model, to identify paths through the interior of the building.

As shown in FIG. 1F, and by reference number 145, navigation platform 115 may build a visibility graph based on the vertices associated with the simplified convex hull polygons and an exterior of the building. In some implementations, when generating the visibility graph, navigation platform 115 may connect pairs of points between which lines can be drawn, without touching the simplified convex hull polygons and without going over an outer edge of the exterior of the building, to generate the visibility graph. In this way, navigation platform 115 may create a visibility graph that represents potential lines of sight within the interior of the building, as further shown in FIG. 1F. In some implementations, navigation platform 115 may store the visibility graph in a data structure (e.g., a database, a table, a list, and/or the like) associated with navigation platform 115.

Figure 1G:
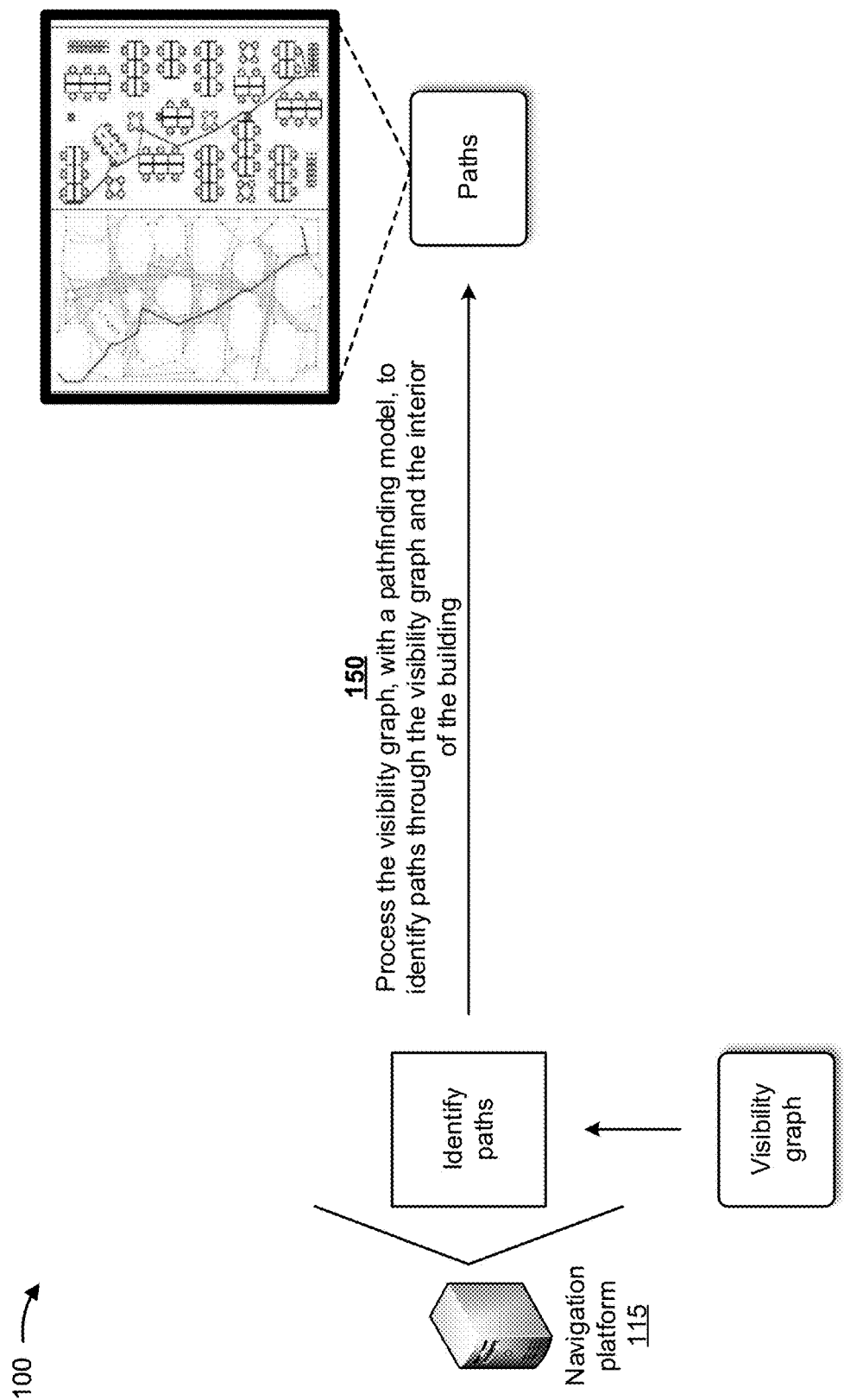

As shown in FIG. 1G, and by reference number 150, navigation platform 115 may process the visibility graph, with a pathfinding model, to identify paths through the visibility graph, and thus, the interior of the building. For example, navigation platform 115 may process the visibility graph, with the pathfinding model, to create a plurality of routes between any two points in the visibility graph, and to select a path (e.g., a shortest path, a straightest path, and/or the like), as shown by the darker line in FIG. 1G, through the visibility graph and the interior of the building. Although only a single path is shown in FIG. 1G, navigation platform 115 may identify multiple paths through the visibility graph and the interior of the building. In some implementations, the pathfinding model may include an A* search model, a Dijkstra's shortest path first model, and/or the like. In some implementations, navigation platform 115 may store the identified paths through the visibility graph and the interior of the building in a data structure (e.g., a database, a table, a list, and/or the like) associated with navigation platform 115.

Figure 1H:
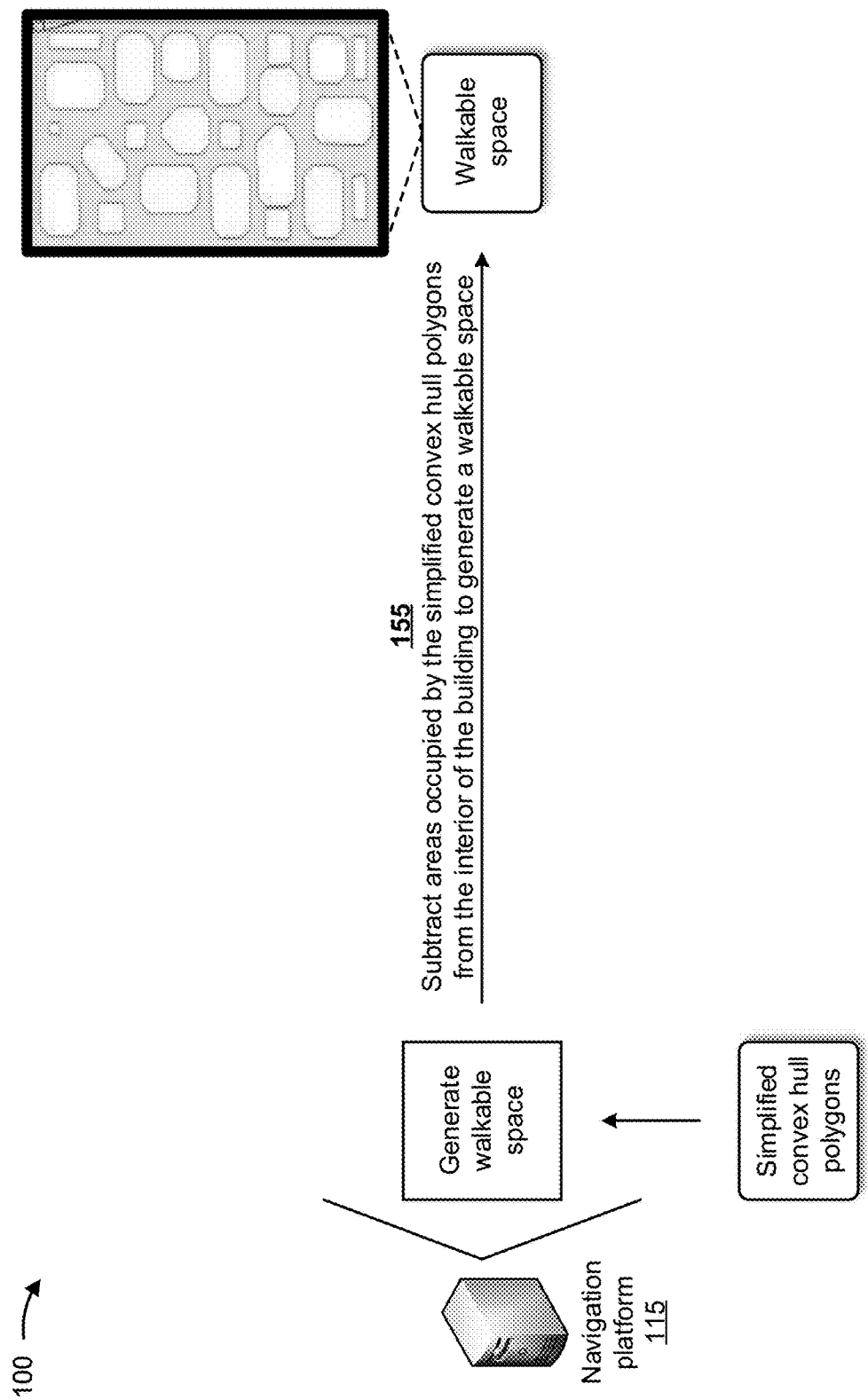

Alternatively, or additionally, and as shown by reference number 155 in FIG. 1H, navigation platform 115 may subtract areas occupied by the simplified convex hull polygons from the interior of the building to generate a walkable space. The walkable space may include all area within the interior of the building that is not included within any of the simplified convex hull polygons. For example, the walkable space may correspond to the grey shaded area shown in FIG. 1H. In some implementations, navigation platform 115 may store data representing the walkable space in a data structure (e.g., a database, a table, a list, and/or the like) associated with navigation platform 115.

Figure 1I:
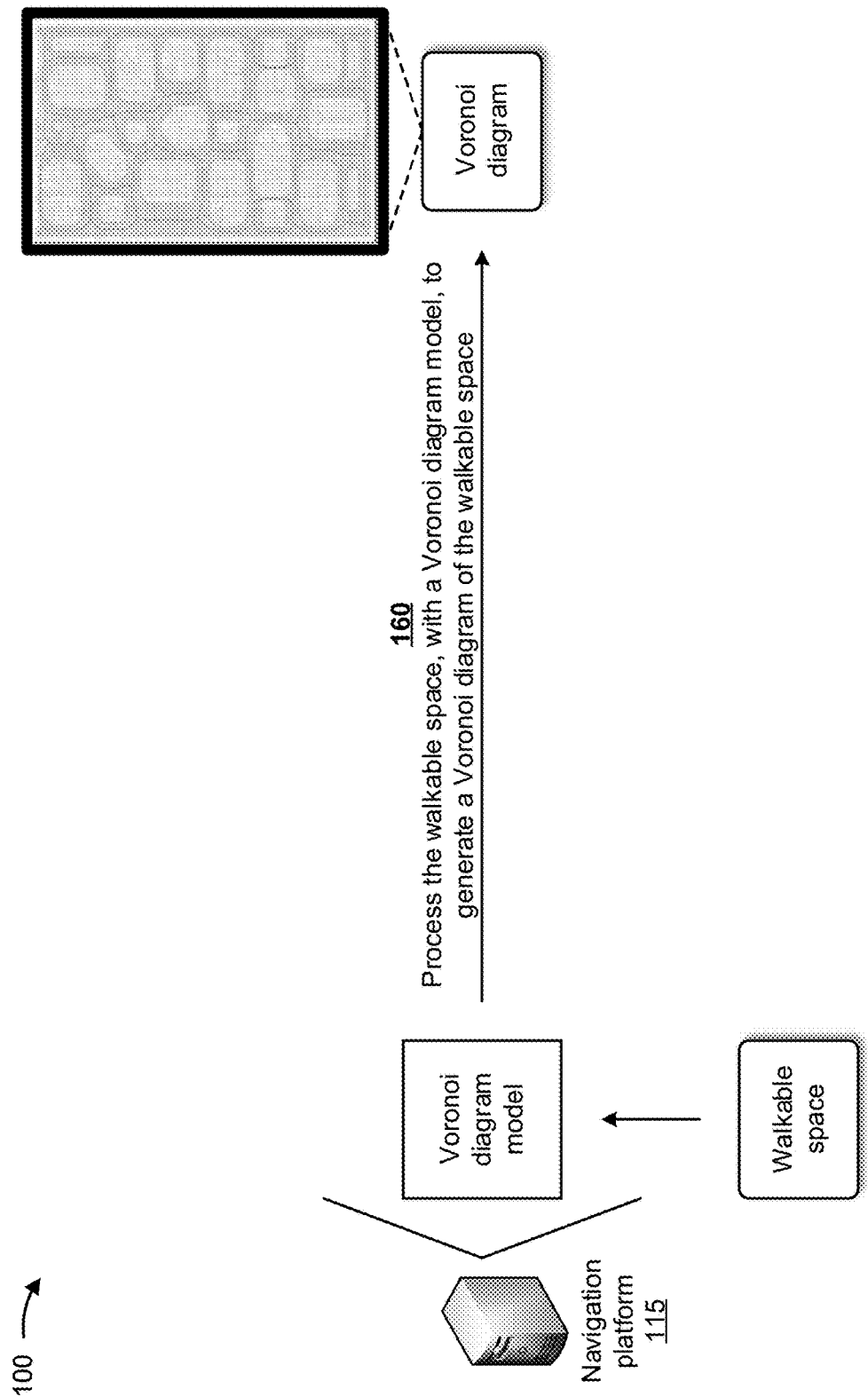

As shown in FIG. 1I, and by reference number 160, navigation platform 115 may process the walkable space, with a Voronoi diagram model, for example, to generate a diagram (e.g., a Voronoi diagram) of the walkable space. A Voronoi diagram is a partitioning of a plane with points into convex polygons, such that each polygon contains exactly one generating point (e.g., a seed) and every point in a given polygon is closer to its generating point than to any other. In some implementations, when processing the walkable space with the Voronoi diagram model, navigation platform 115 may convert edges of the walkable space into evenly-spaced points to be utilized as seeds. Navigation platform 115 may calculate interpolation distances between the seeds, and may generate the Voronoi diagram of the walkable space based on calculating the interpolation distances between the seeds. In some implementations, the interpolation distances may be variable, selectable, modifiable, and/or the like based on objectives and/or constraints associated with generating the paths for indoor navigation. For example, a smaller interpolation distance may be selected to create straighter and more consistent walking paths, whereas a larger interpolation distance may be selected to conserve computation time and computing resources. As one example, an interpolation distance of a particular value (e.g., in millimeters, centimeters, meters, and/or the like) may be selected. In some implementations, navigation platform 115 may store data representing the Voronoi diagram in a data structure (e.g., a database, a table, a list, and/or the like) associated with navigation platform 115.

Figure 1J:
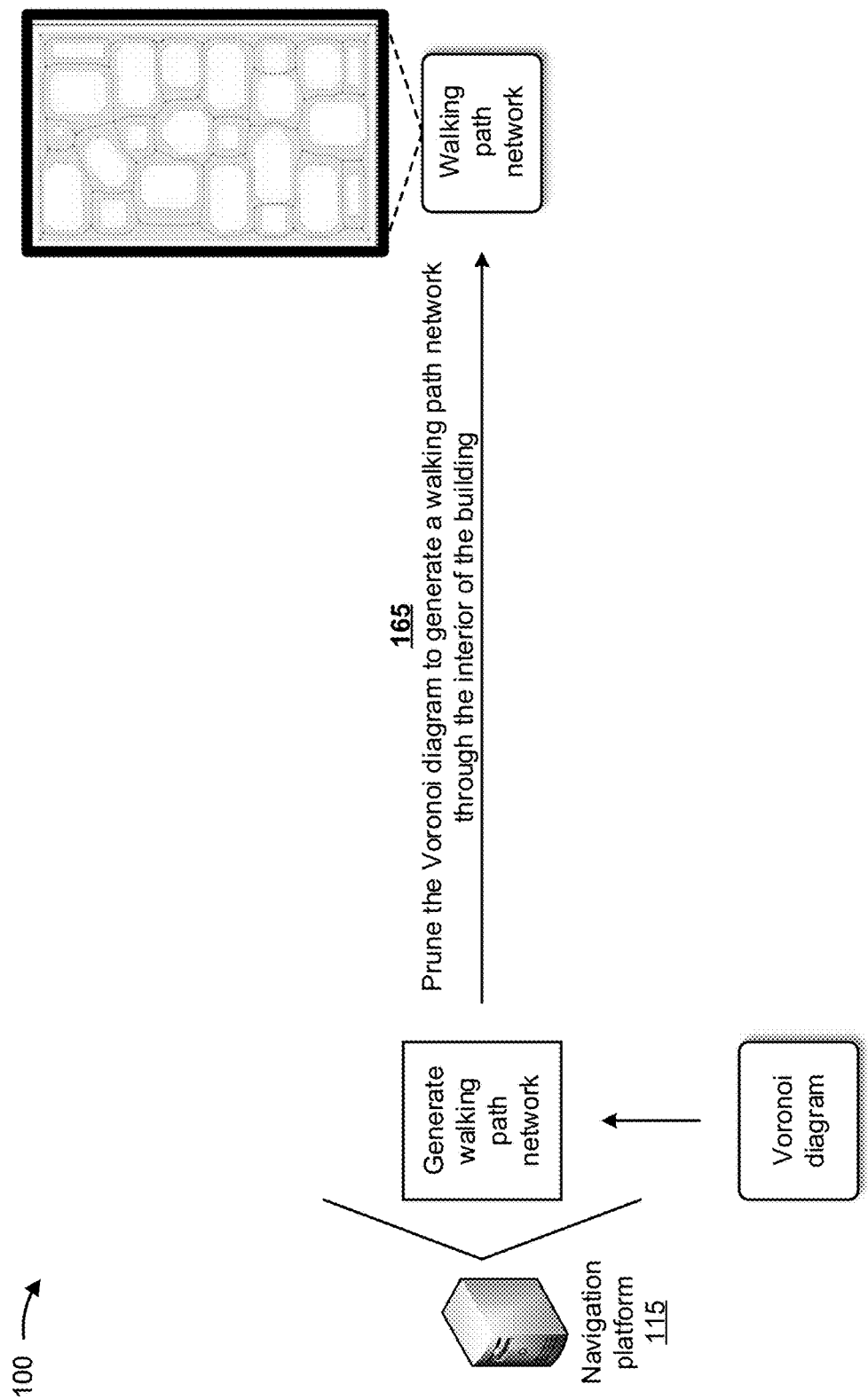

As shown in FIG. 1J, and by reference number 165, navigation platform 115 may prune the Voronoi diagram to generate a walking path network through the interior of the building. In some implementations, when pruning the Voronoi diagram, navigation platform 115 may remove vertices of the Voronoi diagram that are not fully contained within the walkable space, and may generate the walking path network based on removing the vertices of the Voronoi diagram. The remaining vertices may be connected with a series of lines that are equidistant from two or more obstacles, as further shown in FIG. 1J. This may generate walking paths that are optimized with respect to walking without being closer than necessary to obstacles. In some implementations, navigation platform 115 may store data representing the walking path network in a data structure (e.g., a database, a table, a list, and/or the like) associated with navigation platform 115.

Figure 1K:
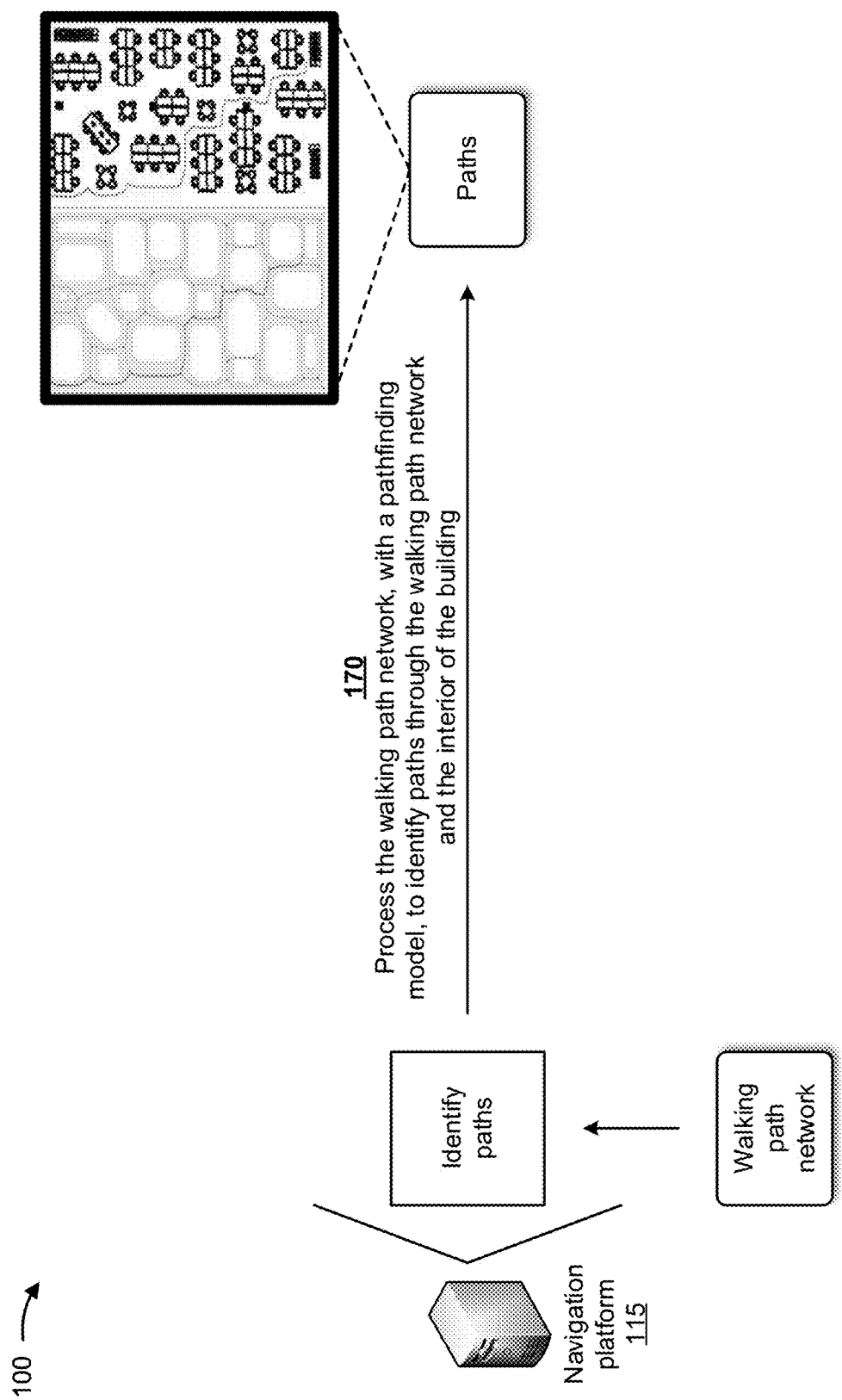

As shown in FIG. 1K, and by reference number 170, navigation platform 115 may process the walking path network, with a pathfinding model, to identify paths through the walking path network and the interior of the building. For example, navigation platform 115 may process the walking path network, with the pathfinding model, to create a plurality of routes between any two points in the visibility graph, and to select a path (e.g., a shortest path, a straightest path, and/or the like), as shown by the darker line in FIG.

1K, through the walking path network and the interior of the building. Although only a single path is shown in FIG. 1K, navigation platform 115 may identify multiple paths through the walking path network and the interior of the building. In some implementations, the pathfinding model may include an A* search model, a Dijkstra's shortest path first model, and/or the like. In some implementations, navigation platform 115 may store the identified paths through the walking path network and the interior of the building in a data structure (e.g., a database, a table, a list, and/or the like) associated with navigation platform 115.

In some implementations, navigation platform 115 may process the identified paths to create straighter paths, to add additional paths, and/or the like. In some implementations, navigation platform 115 may receive information indicating a modification to the architectural floor plan of the interior of the building, and modify at least one of the identified paths based on the modification to the architectural floor plan. In some implementations, navigation platform 115 may retrain one or more of the vectorization model, the machine learning model, the convex hull model, or the pathfinding model based on the identified paths.

Figure 1L:
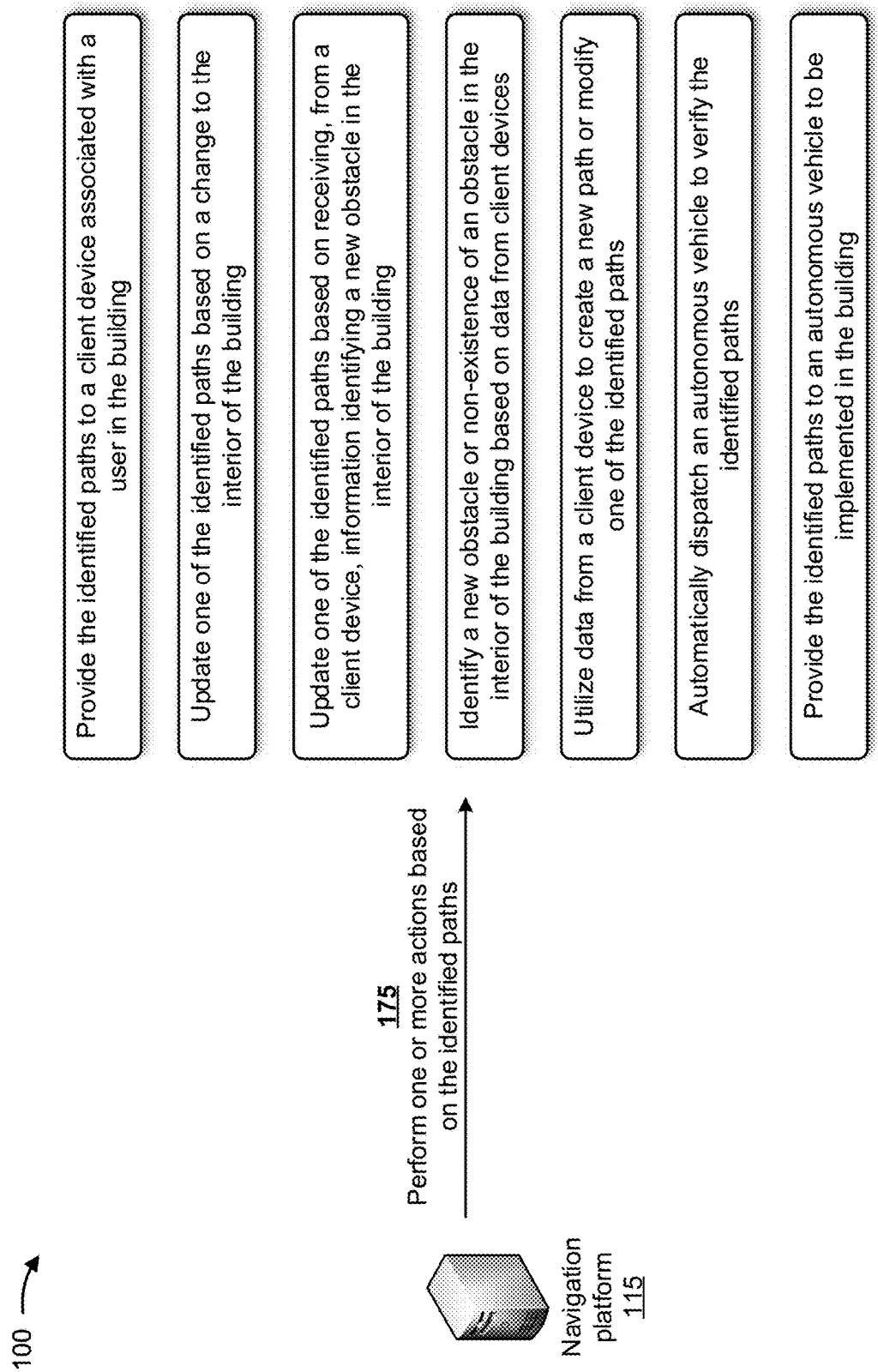

As shown in FIG. 1L, and by reference number 175, navigation platform 115 may perform one or more navigation actions based on the identified paths. In some implementations, the one or more navigation actions may include navigation platform 115 providing the identified paths to a client device 105 associated with a user in the building. For example, navigation platform 115 may provide the identified paths for display on a user interface of client device 105, along with turn-by-turn directions for paths selected via the user interface. In some implementations, client device 105 may display a location of the user in association with the identified paths (e.g., superimposed on a map that includes the paths) based on location information received from client device 105 or from another device that tracks a location of client device 105. In this way, navigation platform 115 may enable the user to navigate the interior of the building quickly and efficiently (e.g., by taking an optimal path), which may save time for the user, conserve resources that would otherwise be consumed requesting directions, rescheduling missed appointments, mitigating repercussions of missed deliveries, and/or the like.

In some implementations, the one or more navigation actions may include navigation platform 115 updating one of the identified paths based on a change to the interior of the building. For example, navigation platform 115 may receive information indicating a modification to the architectural floor plan of the interior of the building, and may modify at least one of the identified paths based on the modification to the architectural floor plan. In this way, navigation platform 115 may update the paths quickly and efficiently. Additionally, or alternatively, navigation platform 115 may receive a modified architectural floor plan, and may perform processes similar to those described above to automatically generate a new set of identified paths. In this way, navigation platform 115 may conserve computing resources, networking resources, and/or the like that would otherwise be wasted attempting to update the paths in a less efficient manner.

In some implementations, the one or more navigation actions may include navigation platform 115 updating one or more of the identified paths based on receiving, from client device 105, information identifying a new obstacle in the interior of the building. For example, a user of client device 105 may indicate, via a user interface, that a new obstacle exists, a location of the obstacle, a size of the obstacle, boundaries of the obstacle, and/or the like. In some implementations, the user may indicate the position, size, shape, and/or the like of the obstacle by walking closely around the obstacle. In this way, navigation platform 115 may update the identified paths quickly and efficiently (e.g., compared to waiting for an occasional inspection to take place), thereby conserving resources that would otherwise be required to identify the new obstacle.

In some implementations, the one or more navigation actions may include navigation platform 115 identifying a new obstacle or non-existence of an obstacle in the interior of the building based on data from client devices 105. For example, navigation platform 115 may identify a new obstacle based on receiving data indicating that client devices 105 consistently move around an area of an identified path rather than walking through the area. As another example, navigation platform 115 may identify non-existence of an obstacle based on receiving data indicating that that client devices 105 consistently move through an area where an obstacle has been indicated to exist. In this way, navigation platform 115 may utilize information available from client devices 105 to quickly and efficiently identify an addition or removal of an obstacle and to update the paths accordingly.

In some implementations, the one or more navigation actions may include navigation platform 115 utilizing data from client device 105 to create a new path or modify one of the identified paths. For example, navigation platform 115 may infer that a new obstacle exists based on client device 105 moving around an area on a particular identified path, based on receiving similar data from multiple client devices 105 as described above, and/or the like, and may eliminate the particular identified path from the identified paths. In some implementations, navigation platform 115 may infer an approximate location, shape, and/or size of the obstacle, and may perform one or more of the processes described above. As another example, navigation platform 115 may infer that an obstacle no longer exists based on client device 105 moving through an area the obstacle was previously indicated as occupying, based on receiving similar data from multiple client devices 105 as described above, and/or the like, and may add a new path to or modify a path of the identified paths. In some implementations, navigation platform 115 may infer an approximate location, shape, and/or size of the obstacle and perform one or more of the processes described above to identify new paths, and/or the like.

In some implementations, the one or more navigation actions may include navigation platform 115 automatically dispatching an autonomous vehicle to verify the identified paths. For example, navigation platform 115 may dispatch a robot and/or a drone or unmanned aerial vehicle (UAV) to traverse the identified paths to confirm that no obstacles impede the path of the autonomous vehicle. In this way, navigation platform 115 may automatically verify the identified paths without requiring arrangement of one or more humans to walk all the identified paths, waiting for one or more humans to walk all the paths, and/or the like.

In some implementations, the one or more navigation actions may include navigation platform 115 providing the identified paths to an autonomous vehicle to be implemented in the building. For example, navigation platform 115 may provide one or more of the identified paths to a robot and/or a UAV that is required to traverse the one or more identified paths to perform one or more functions in the interior of the building (e.g., manufacturing functions in a manufacturing facility, delivery functions in an office building, and/or the like). In this way, navigation platform 115 may enable the use of an autonomous vehicle that does not require as many sensors, sophisticated sensors, extensive human control and/or intervention, detailed pre-programming, and/or the like to perform the functions.

In this way, several different stages of the process for automatically generating paths for indoor navigation are automated via modeling, which may remove human subjectivity and waste from the process, and which may improve speed and efficiency of the process and conserve computing resources (e.g., processing resources, memory resources, communication resources, and/or the like), networking resources, and/or the like. Furthermore, implementations described herein use a rigorous, computerized process to perform tasks or roles that were not previously performed or were previously performed using subjective human intuition or input. For example, currently there does not exist a technique that utilizes modeling to automatically generate paths for indoor navigation in the manner described herein. Finally, the process for utilizing modeling to automatically generate paths for indoor navigation reduces time required to map paths through an interior of a building, and conserves computing resources, networking resources, human resources and/or the like, and/or the like that would otherwise be wasted incorrectly generating walking paths, correcting the incorrectly-generated walking paths, and/or the like.

As indicated above, FIGS. 1A-1L are provided merely as examples. Other examples may differ from what was described with regard to FIGS. 1A-1L. The number and arrangement of devices and networks shown in FIGS. 1A-1L are provided as an example. In practice, there may be additional devices and/or networks, fewer devices and/or networks, different devices and/or networks, or differently arranged devices and/or networks than those shown in FIGS. 1A-1L. Furthermore, two or more devices shown in FIGS. 1A-1L may be implemented within a single device, or a single device shown in FIGS. 1A-1L may be implemented as multiple, distributed devices. Additionally, or alternatively, a set of devices (e.g., one or more devices) of FIGS. 1A-1L may perform one or more functions described as being performed by another set of devices of FIGS. 1A-1L.

Figure 2:
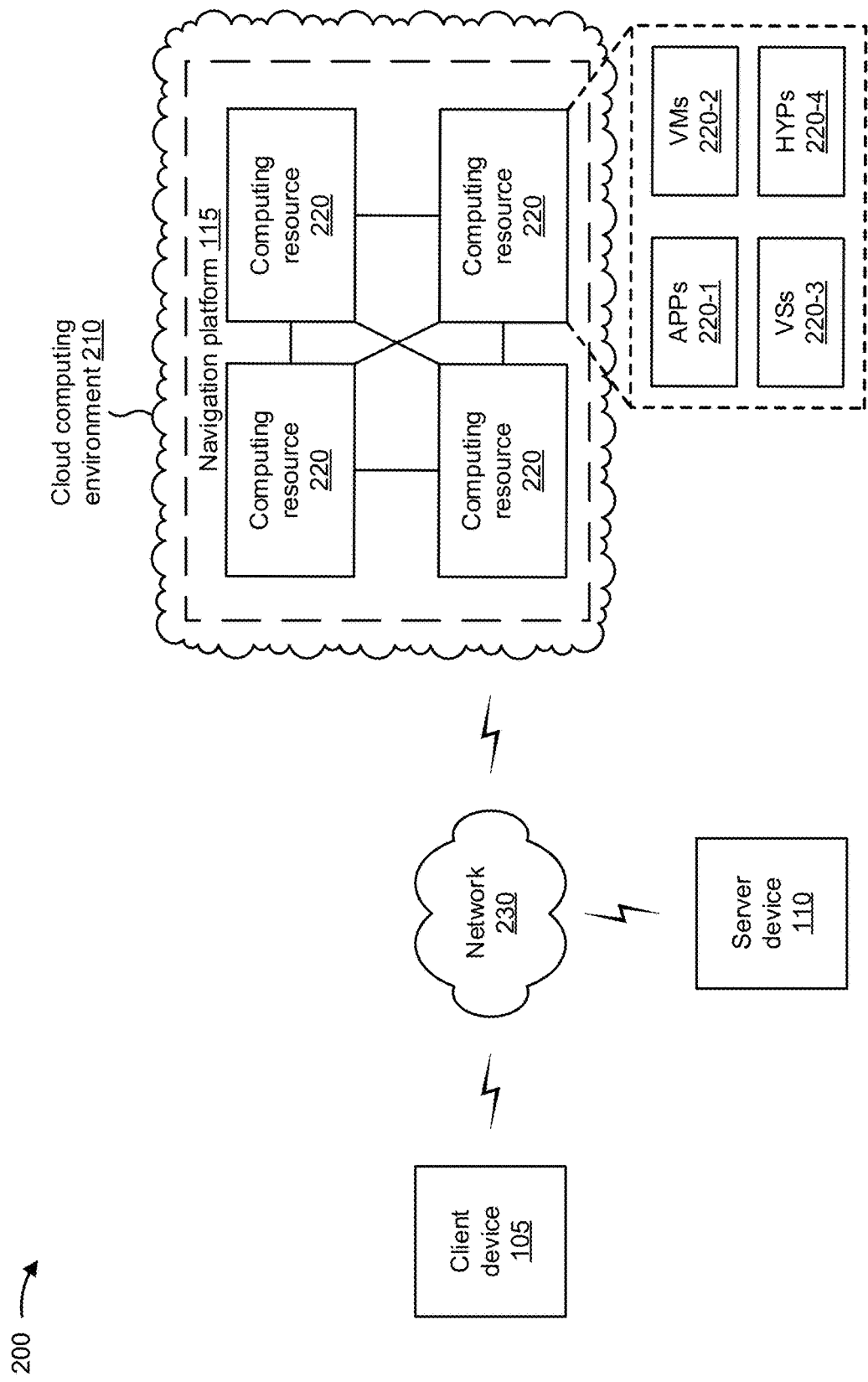
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include client device 105, server device 110, navigation platform 115, and a network 230. Devices of environment 200 may interconnect via wired connections, wireless connections, or a combination of wired and wireless connections.

Client device 105 includes one or more devices capable of receiving, generating, storing, processing, and/or providing information, such as information described herein. For example, client device 105 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), an autonomous vehicle, or a similar type of device. In some implementations, client device 105 may receive information from and/or transmit information to server device 110 and/or navigation platform 115.

Server device 110 includes one or more devices capable of receiving, generating, storing, processing, and/or providing information, as described herein. For example, server device 110 may include a laptop computer, a tablet computer, a desktop computer, a group of server devices, or a similar type of device, associated with entities that require navigation of interiors of buildings. In some implementations, server device 110 may receive information from and/or transmit information to client device 105 and/or navigation platform 115.

Navigation platform 115 includes one or more devices that utilize modeling to automatically generate paths for indoor navigation. In some implementations, navigation platform 115 may be designed to be modular such that certain software components may be swapped in or out depending on a particular need. As such, navigation platform 115 may be easily and/or quickly reconfigured for different uses. In some implementations, navigation platform 115 may receive information from and/or transmit information to one or more client devices 105 and/or one or more server devices 110.

In some implementations, as shown, navigation platform 115 may be hosted in a cloud computing environment 210. Notably, while implementations described herein describe navigation platform 115 as being hosted in cloud computing environment 210, in some implementations, navigation platform 115 may not be cloud-based (i.e., may be implemented outside of a cloud computing environment) or may be partially cloud-based.

Cloud computing environment 210 includes an environment that hosts navigation platform 115. Cloud computing environment 210 may provide computation, software, data access, storage, etc., services that do not require end-user knowledge of a physical location and configuration of system(s) and/or device(s) that hosts navigation platform 115. As shown, cloud computing environment 210 may include a group of computing resources 220 (referred to collectively as "computing resources 220" and individually as "computing resource 220").

Computing resource 220 includes one or more personal computers, workstation computers, mainframe devices, or other types of computation and/or communication devices. In some implementations, computing resource 220 may host navigation platform 115. The cloud resources may include compute instances executing in computing resource 220, storage devices provided in computing resource 220, data transfer devices provided by computing resource 220, etc. In some implementations, computing resource 220 may communicate with other computing resources 220 via wired connections, wireless connections, or a combination of wired and wireless connections.

As further shown in FIG. 2, computing resource 220 includes a group of cloud resources, such as one or more applications ("APPs") 220-1, one or more virtual machines ("VMs") 220-2, virtualized storage ("VSs") 220-3, one or more hypervisors ("HYPs") 220-4, and/or the like.

Application 220-1 includes one or more software applications that may be provided to or accessed by client device 105. Application 220-1 may eliminate a need to install and execute the software applications on client device 105. For example, application 220-1 may include software associated with navigation platform 115 and/or any other software capable of being provided via cloud computing environment 210. In some implementations, one application 220-1 may send/receive information to/from one or more other applications 220-1, via virtual machine 220-2.

Virtual machine 220-2 includes a software implementation of a machine (e.g., a computer) that executes programs like a physical machine. Virtual machine 220-2 may be either a system virtual machine or a process virtual machine, depending upon use and degree of correspondence to any real machine by virtual machine 220-2. A system virtual machine may provide a complete system platform that supports execution of a complete operating system ("OS"). A process virtual machine may execute a single program and may support a single process. In some implementations, virtual machine 220-2 may execute on behalf of a user (e.g., a user of client device 105 or an operator of navigation platform 115), and may manage infrastructure of cloud computing environment 210, such as data management, synchronization, or long-duration data transfers.

Virtualized storage 220-3 includes one or more storage systems and/or one or more devices that use virtualization techniques within the storage systems or devices of computing resource 220. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 220-4 may provide hardware virtualization techniques that allow multiple operating systems (e.g., "guest operating systems") to execute concurrently on a host computer, such as computing resource 220. Hypervisor 220-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
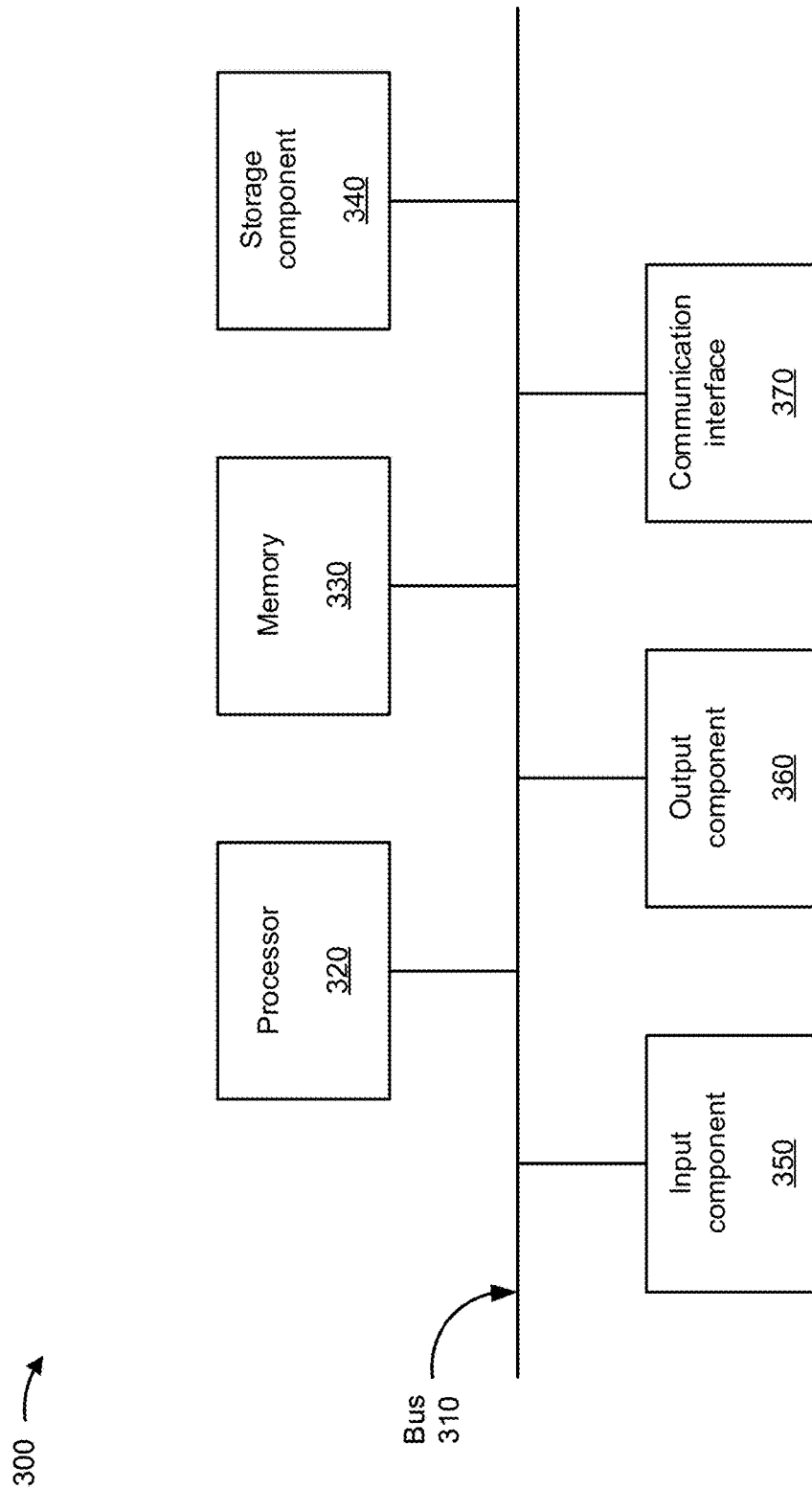
FIG. 3 is a diagram of example components of one or more devices of FIG. 2.

FIG. 3 is a diagram of example components of a device 300. Device 300 may correspond to client device 105, server device 110, navigation platform 115, and/or computing resource 220. In some implementations, client device 105, server device 110, navigation platform 115, and/or computing resource 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
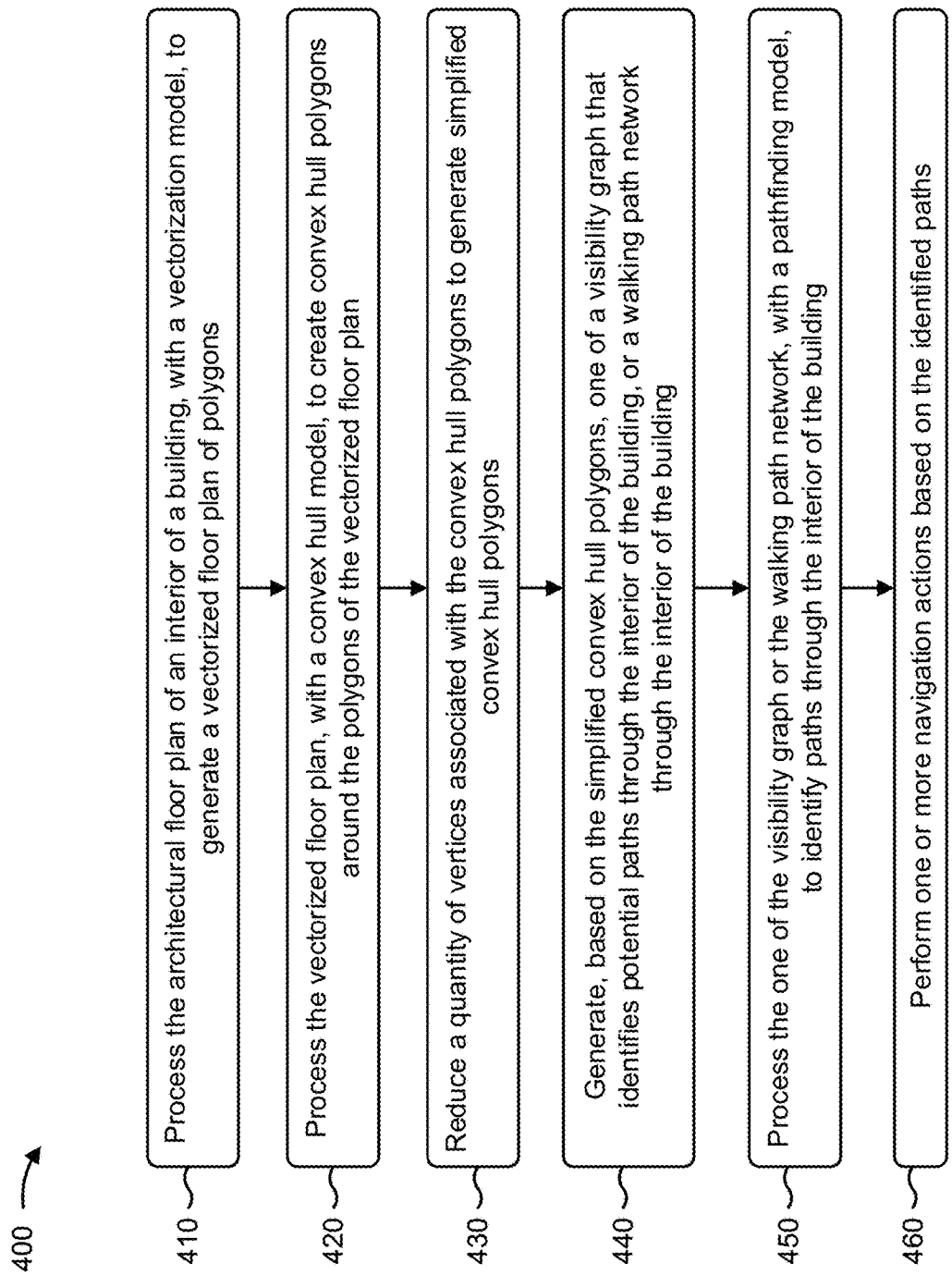
FIG. 4 is a flow chart of an example process for utilizing modeling to automatically generate paths for indoor navigation.

FIG. 4 is a flow chart of an example process 400 for utilizing modeling to automatically generate paths for indoor navigation. In some implementations, one or more process blocks of FIG. 4 may be performed by a device (e.g., navigation platform 115). In some implementations, one or more process blocks of FIG. 4 may be performed by another device or a group of devices separate from or including the device, such as a client device (e.g., client device 105) and/or a server device (e.g., server device 110).

As further shown in FIG. 4, process 400 may include processing an architectural floor plan of an interior of a building, with a vectorization model, to generate a vectorized floor plan of polygons (block 410). For example, the device (e.g., using computing resource 220, processor 320, memory 330, and/or the like) may process an architectural floor plan of an interior of a building, with a vectorization model, to generate a vectorized floor plan of polygons, as described above.

As further shown in FIG. 4, process 400 may include processing the vectorized floor plan, with a convex hull model, to create polygons (e.g., convex hull polygons) around the polygons of the vectorized floor plan (block 420). For example, the device (e.g., using computing resource 220, processor 320, storage component 340, and/or the like) may process the vectorized floor plan, with a convex hull model, to create convex hull polygons around the polygons of the vectorized floor plan, as described above.

As further shown in FIG. 4, process 400 may include reducing a quantity of vertices associated with the convex hull polygons to generate simplified convex hull polygons (block 430). For example, the device (e.g., using computing resource 220, processor 320, memory 330, storage component 340, and/or the like) may reduce a quantity of vertices associated with the convex hull polygons to generate simplified convex hull polygons, as described above.

As further shown in FIG. 4, process 400 may include generating, based on the simplified convex hull polygons, one of a visibility graph that identifies potential paths through the interior of the building, and/or a walking path network through the interior of the building (block 440). For example, the device (e.g., using computing resource 220, processor 320, memory 330, and/or the like) may generate, based on the simplified convex hull polygons, one of a visibility graph that identifies potential paths through the interior of the building, or and a walking path network through the interior of the building, as described above. In some implementations, the visibility graph may be generated based on the vertices associated with the convex hulls and based on an exterior of the building. In some implementations, generating the visibility graph may include connecting pairs of points between which lines can be drawn, without touching the simplified convex hull polygons and without going over an outer edge of the building, to generate the visibility graph.

In some implementations, generating the walking path network may include subtracting areas occupied by the simplified convex hulls from a representation of the interior of the building to generate a walkable space; processing the walkable space, with a Voronoi diagram model, to generate a Voronoi diagram of the walkable space. This implementation may further include pruning the Voronoi diagram to generate the walking path network through the interior of the building.

In some implementations, processing the walkable space may include converting edges of the walkable space into evenly-spaced points to be utilized as seeds, and calculating interpolation distances between the seeds. The Voronoi diagram of the walkable space may be generated based on calculating the interpolation distances between the seeds. In some implementations, pruning the Voronoi diagram may include removing vertices of the Voronoi diagram that are not fully contained within the walkable space, and generating the walking path network based on removing the vertices.

As further shown in FIG. 4, process 400 may include processing the one of the visibility graph or the walking path network, with a pathfinding model, to identify paths through the interior of the building (block 450). For example, the device (e.g., using computing resource 220, processor 320, storage component 340, and/or the like) may process the one of the visibility graph or the walking path network, with a pathfinding model, to identify paths through the interior of the building, as described above. The pathfinding model may include an A* search model or a Dijkstra's shortest path first model.

As further shown in FIG. 4, process 400 may include performing one or more navigation actions based on the identified paths (block 460). For example, the device (e.g., using computing resource 220, processor 320, memory 330, storage component 340, communication interface 370, and/or the like) may perform one or more navigation actions based on the identified paths, as described above. In some implementations, performing the one or more navigation actions may include providing data identifying the identified paths to a client device associated with a user in the building; updating one of the identified paths based on a change to the interior of the building; updating one of the identified paths based on receiving, from a client device, information identifying a new obstacle in the interior of the building; or identifying a new obstacle or non-existence of an obstacle in the interior of the building based on data received from client devices located in the interior of the building.

In some implementations, performing the one or more navigation actions may include utilizing data received from a client device, present in the interior of the building, to create a new path or to modify one of the identified paths; automatically dispatching an autonomous vehicle in the interior of the building to verify the identified paths; or providing data identifying the identified paths to an autonomous vehicle to be implemented in the interior of the building.

Process 400 may include additional implementations, such as any single implementation or any combination of implementations described above, below, and/or in connection with one or more other processes described elsewhere herein.

In some implementations, process 400 may include retraining one or more of the vectorization model, the machine learning model, the convex hull model, or the pathfinding model based on the identified paths.

In some implementations, process 400 may include processing the vectorized floor plan, with a machine learning model, to remove extraneous features from the vectorized floor plan and to generate a processed vectorized floor plan of the polygons. The extraneous features may include a representation of a doorway, textual information, one or more compass arrows, or an architectural icon that does not represent an actual physical feature of the building.

In some implementations, process 400 may include processing the identified paths to create straighter paths and to add additional paths.

In some implementations, process 400 may include receiving information indicating a modification to the architectural floor plan of the interior of the building, and modifying at least one of the identified paths based on the modification to the architectural floor plan.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   processing, by a device, a vectorized floor plan, with a first model, to create convex hull polygons around polygons of the vectorized floor plan;
   generating, by the device and based on the convex hull polygons, one or more of:
      a visibility graph that identifies potential paths through an interior of a building associated with the vectorized floor plan,
         wherein the visibility graph is based on connecting pairs of points that enable lines to be drawn without touching the convex hull polygons, or
      a walking path network through the interior of the building;
   processing, by the device, at least one of the one of the visibility graph or the walking path network, with a second model, to identify paths through the interior of the building; and
   providing, by the device, (i) the paths to enable one or more navigation actions associated with the paths, the paths for display via a map on a user interface of a client device, and (ii) turn-by-turn directions for one or more of the paths.

2. The method of claim 1, wherein the vectorized floor plan is processed to remove extraneous features.

3. The method of claim 1, wherein the first model includes a convex hull model.

4. The method of claim 1, wherein the convex hull polygons include vertices that correspond to vertices in corresponding polygons included in the vectorized floor plan.

5. The method of claim 1, wherein processing at least one of the visibility graph or the walking path network comprises:
   subtracting areas occupied by the convex hull polygons from a representation of the interior of the building to generate a walkable space,
   processing the walkable space with a third model to generate a diagram of walkable space, and
   generating the walking path network based on the diagram of walkable space.

6. The method of claim 1, wherein the second model comprises one or more of:
   an A* search model, or
   a Dijkstra's shortest path first model.

7. A non-transitory computer-readable medium storing a set of instructions, the set of instructions comprising:
one or more instructions that, when executed by one or more processors of a device, cause the device to:
process a vectorized floor plan to create convex hull polygons around polygons of the vectorized floor plan;
generate, based on the convex hull polygons, at least one of:
a visibility graph that identifies potential paths through an interior of a building associated with the vectorized floor plan, or
a walking path network through the interior of the building;
process at least one of the visibility graph or the walking path network to identify paths through the interior of the building,
wherein the one or more instructions, that cause the one or more processors to process the at least one of the visibility graph or the walking path network, cause the device to:
subtract areas occupied by the convex hull polygons from a representation of the interior of the building to generate a walkable space,
process the walkable space with a third model to generate a diagram of walkable space, and
generate the walking path network based on the diagram of walkable space; and
provide, (i) for display via a map on a user interface of a client device, the paths to enable one or more navigation actions associated with the paths and (ii) turn-by-turn directions for one or more of the paths.

8. The non-transitory computer-readable medium of claim 7, wherein the vectorized floor plan is based on an architectural floor plan that represents the interior of the building.

9. The non-transitory computer-readable medium of claim 7, wherein the one or more instructions, that cause device to process the vectorized floor plan, cause the device to:
process the vectorized floor plan to create the convex hull polygons around polygons of the vectorized floor plan.

10. The non-transitory computer-readable medium of claim 7, where the one or more instructions, that cause the device to generate the walking path network, cause the device to:
process the walkable space associated with the interior of the building, with a Voronoi diagram model, to generate a Voronoi diagram of the walkable space; and
prune the Voronoi diagram to generate the walking path network.

11. The non-transitory computer-readable medium of claim 7, wherein the one or more instructions further cause the device to:
simplify the convex hull polygons to reduce a quantity of vertices associated with the convex hull polygons.

12. The non-transitory computer-readable medium of claim 7, wherein the visibility graph represents potential lines of sight within the interior of the building.

13. The non-transitory computer-readable medium of claim 7, where the one or more instructions, that cause the device to generate the walking path network, cause the device to:
generate the walkable space;
convert edges of the walkable space into evenly-spaced points to be utilized as seeds;
calculate interpolation distances between the seeds;
generate a Voronoi diagram of the walkable space based on calculating the interpolation distances between the seeds; and
prune the Voronoi diagram to generate the walking path network.

14. A device, comprising:
one or more processors configured to:
process, using a model, a vectorized floor plan to create convex hull polygons around polygons of the vectorized floor plan;
generate, based on the convex hull polygons, at least one of:
a visibility graph that identifies potential paths through an interior of a building associated with the vectorized floor plan, or
a walking path network through the interior of the building,
wherein the one or more processors, to generate the walking path network, are configured to:
process walkable space associated with the interior of the building, with a Voronoi diagram model, to generate a Voronoi diagram of the walkable space; and
prune the Voronoi diagram to generate the walking path network;
process the at least one of the visibility graph or the walking path network to identify paths through the interior of the building; and
provide, (i) for display via a map on a user interface of a client device, the paths to enable one or more navigation actions associated with the paths and (ii) turn-by-turn directions for one or more of the paths.

15. The device of claim 14, wherein the one or more processors are further configured to:
reduce a quantity of vertices associated with the convex hull polygons.

16. The device of claim 14, wherein the one or more processors are further configured to:
receive information indicating a modification to an architectural floor plan of the interior of the building; and
modify at least one of the paths through the interior of the building based on the information indicating the modification.

17. The device of claim 14, wherein the one or more processors, to generate the visibility graph, are configured to:
connect pairs of points between which lines can be drawn, without touching the convex hull polygons and without going over an outer edge of the building, to generate the visibility graph.

18. The device of claim 14, wherein the model is trained based on a plurality of architectural floor plans that include a plurality of extraneous features not associated with actual physical features of a plurality of buildings.

19. The device of claim 14, wherein the one or more processors are further configured to:
perform the one or more navigation actions based on the identified paths.

* * * * *